United States Patent [19]
Bourgeois et al.

[11] Patent Number: 5,940,767
[45] Date of Patent: Aug. 17, 1999

[54] INTELLIGENT DOCKING STATION FOR USE WITH A PORTABLE WIRELESS RECEIVER TO PROVIDE EXPANDED SHORT MESSAGE SERVICES

[75] Inventors: Troy Bourgeois, Apex; Patrik Lilja, Raleigh, both of N.C.

[73] Assignee: Ericsson, Inc., Research Triangle Park, N.C.

[21] Appl. No.: 08/646,166

[22] Filed: May 7, 1996

[51] Int. Cl.[6] ............................................. H04B 1/03
[52] U.S. Cl. ..................... 455/466; 455/412; 455/557; 455/349
[58] Field of Search ................... 455/466, 556, 455/557, 414, 424–426, 403, 550, 462, 344, 90, 348, 349, 412; 370/259; 340/825.44

[56] References Cited

U.S. PATENT DOCUMENTS

| | | | |
|---|---|---|---|
| 4,291,411 | 9/1981 | Müller et al. | 455/88 |
| 4,680,787 | 7/1987 | Marry | 455/557 |
| 4,776,000 | 10/1988 | Parlenti | 379/62 |
| 4,882,770 | 11/1989 | Miyahira et al. | 455/603 |
| 5,241,410 | 8/1993 | Streck et al. | 359/176 |
| 5,479,479 | 12/1995 | Braitberg et al. | 379/58 |
| 5,561,712 | 10/1996 | Nishihara | 379/355 |
| 5,659,890 | 8/1997 | Hidaka | 455/556 |
| 5,687,216 | 11/1997 | Svensson | 379/58 |

FOREIGN PATENT DOCUMENTS

| | | |
|---|---|---|
| 0585030A1 | 8/1992 | European Pat. Off. . |
| 0 645 941 A2 | 3/1995 | European Pat. Off. . |
| 04 035321 | 2/1992 | Japan . |
| 2 264 613 | 9/1993 | United Kingdom . |
| 2 289 555 | 11/1995 | United Kingdom . |
| 2 290 007 | 12/1995 | United Kingdom . |
| WO 95/06996 | 3/1995 | WIPO . |

OTHER PUBLICATIONS

Jeff King and Silvia Viteri; *Holster With Secondary LCD and Electronics Used to Store and/or Display Messages*, Motorola Technical Developments, vol. 11, Oct. 1990; p. 137.

*Primary Examiner*—Wellington Chin
*Assistant Examiner*—Philip J. Sobuta
*Attorney, Agent, or Firm*—Jenkens & Gilchrist, P.C.

[57] ABSTRACT

A digital communication system with digital short message system text capability including a miniaturized transceiver and cooperating intelligent docking station which provides memory to store the received texts and for indication and selective display of the short message service texts plus additional external communication links to other networks.

19 Claims, 1 Drawing Sheet

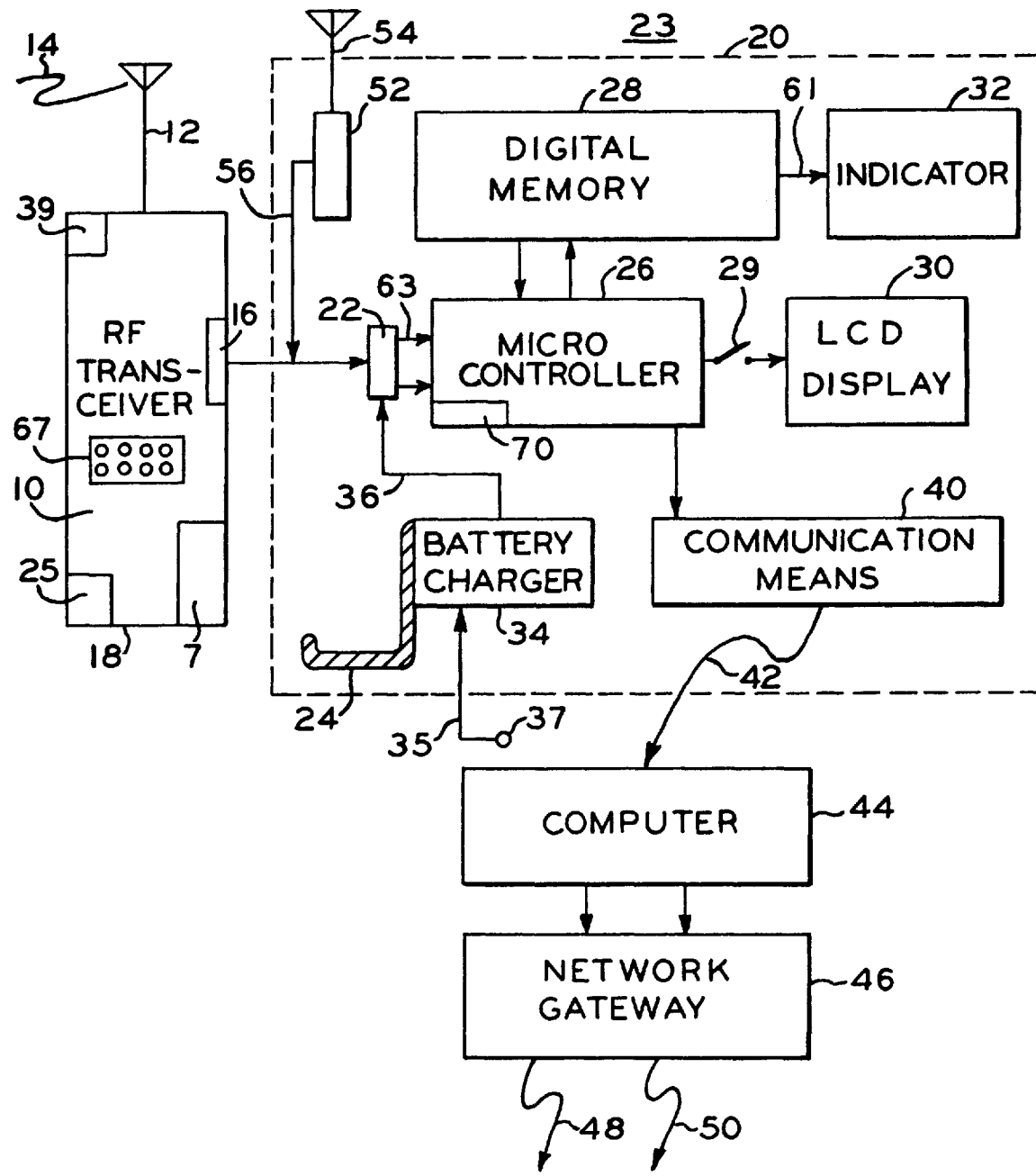
FIG_1

INTELLIGENT DOCKING STATION FOR USE WITH A PORTABLE WIRELESS RECEIVER TO PROVIDE EXPANDED SHORT MESSAGE SERVICES

BACKGROUND OF INVENTION

Personal use radio frequency (RF) transceivers such as cellular phones continue to decrease in size approaching cigarette-pack size for convenient carrying in shirt pockets. Small transceivers are severely limited in their capability to include physically large components such as occasional-use digital memory banks. At the same time transceivers are being designed to include short message service (SMS) message capability. SMS messages are transmitted text which can be transmitted digitally to portable digital wireless transceivers such as cellular telephones where the messages may be displayed on a liquid crystal display. A typical message may, for example, include instructions to call a particular customer telephone number or to call the office. This service enables the cellular phone to finction as similar to a combination beeper and answering machine to record and later display brief messages transmitted in the absence of the user or while the user is otherwise occupied. While SMS has not yet become commercially available in the United States it is part of the European Global System for Mobile Communications (GSM) and is the subject of interim industry standards IS-136 and IS-137 in the United States.

However, the diminishing size of portable transceivers, whether RF or infrared, presents a challenge regarding the inclusion of adequate memory capability to receive, record and playback on demand a number of recorded texts.

In addition to the problem of adding memory capability to transceivers being shrunk in size, it is also desirable to be able to add external communications means to facilitate communications to other networks through other communications links further compounding the size problem.

OBJECTS OF SUMMARY AND INVENTION

Accordingly it is an object of the present invention to provide an improved added capability portable communications unit suitable for miniaturization.

It is another object of the present invention to provide an improved portable communication unit in which cooperating components are included in a cooperating docking station.

It is still another object of the present invention to provide an improved miniaturized digital portable communication system with expandable short message service capabilities.

It is yet another object of the present invention to provide an improved hand-held miniaturized portable communication system with communications means which facilitate communications through multiple links.

In order to attain the above and other related objectives, in carrying out the present invention in one form thereof, a portable communication system with expandable short message service capabilities includes a portable digital wireless transceiver including short message service receiving capabilities and a cooperating intelligent docking station including means to interconnect the transceiver and the docking station for the storage in memory and subsequent selective displaying through the transceiver of a plurality of short message service texts received by the transceiver. The docking station may also include battery charging means for the battery in the transceiver and external communications means to communicate with other equipment through other types of communication links. The docking station includes means to support the interconnected transceiver on the docking station to receive short message service texts in the absence of a user for subsequent selective display with an indicator indicating the presence of stored texts.

BRIEF DESCRIPTION OF DRAWINGS

FIG. 1 is a simplified block diagram showing a portable communication system incorporating the present invention.

Referring to FIG. 1, portable communication system 1 includes portable hand-held digital wireless transceiver 10 such as a cellular phone with a suitable antenna 12 for receiving radio frequency communications 14.

Intelligent docking station 20 includes an interface plug or connector 22 configured for mating with connector or female receptacle 16 on wireless transceiver 10 and cuplike holder 24 is configured to receive bottom 18 of transceiver 10 to secure the transceiver in place upon intelligent docking station 20 with mating electrical interconnections provided by receptacle 16 and connector 22. Micro-controller 26 within docking station 20 provides a means of providing short message service text received by transceiver 10 and provided through receptacle 16 and connector 22 to digital memory 28 to be selectively displayed on liquid crystal display (LCD) 30. An indicator 32 which may be an audible beep or other noise, or a visible indicator light (or a combination thereof) indicates that short message service text has been received and is stored in digital memory 28.

Battery charger 34 within docking station 20 receives input power 35 from a power source 37 which in the case of a vehicle such as an automobile may conveniently be the vehicle's battery. Direct current voltage 36 is provided from battery charger 34 through mating connectors 22 and 16 to battery 7 within transceiver 10.

In operation, SMS digital texts when transmitted to RF transceiver 10 will in the absence of a receiving operator or user be stored through controller 26 and digital memory 28 with indicator 32 indicating the presence of stored texts messages. Actuation of switch 39 will display the stored texts on LCD display 30. Since the controller 26 and digital memory 28 are included within intelligent docking station 20 there is no problem providing adequate capability and space to enable the reception and storage of a large number of SMS texts. This enables the size of transceiver 10 to be maintained in a miniature state suitable for carrying in a shirt pocket even though expanded capabilities such as SMS texts are added. Indicator 32 may be included in transceiver 10 to also show the presence SMS text in memory when the transceiver is removed from its cooperating position on docking station 20.

Docking station 20 utilizes cooperating vehicle antenna 54 to assist transceiver 10 in receiving and storing in digital memory 28 any messages transmitted while the transceiver is docked or connected to the docking station through lead 56 and connector 22 and receptacle 16. Receiver 52 may be included in docking station 20 and activated by lead or pin 56 upon the removal of transceiver 10 from docking station 20 to enable reception and recording of SMS messages received while transceiver 10 is carried or used outside of or away from the vehicle or office in which docking station 20 is located or installed.

The capabilities of communication system 1 of the present invention may be further expanded while nevertheless continuing to maintain or even shrink the size of portable transceiver 10 by use of communications means 40 within docking station 20 to communicate to a remote receiving means such as computer 44 by radio frequency or infrared transmission 42. Computer 44 may include network gateways 46 for further transmissions 48 and 50 through or to other networks and which may include wireless links or a local area network gateway router.

While the present short message service is directed at short text messages of 64–245 alphanumeric characters the expanded memory and display possible through use of the subject intelligent docking station enables expansion of the communication system and its capabilities to include voice mail or messages and fax mailboxes including analog operation and use and the use of a plurality of memory units 28 or the selection of a memory unit with suitable capability for the particular portable communication system 1.

The present invention is particularly suitable for installation in a vehicle such as an automobile wherein docking station 20 may conveniently be positioned on the console or otherwise installed within easy reach of the vehicle operator or operating position indicated generally as 23 to provide a convenient holder 24 for transceiver 10 along with battery charging power 36 plus the expanded communication capabilities as described above through interconnections 16 and 22 to electronics 26 and digital memory 28. Controller 26 and digital memory 28 and communication means 40 can conveniently be positioned remote from docking station 20 and connected by cabling to enable these components to be located outside of the docking station such as under the front seat of the vehicle in which portable communication system 1 is located. This will facilitate maintaining a small docking station 20 size and also enable the SMS message capability to be an optional plug in addition and/or retrofit feature to a standard docking station. External extension cabling such as 61 and 63 with appropriate end connectors would be used to selectively connect controller 26 and digital memory 28 and/or communication means 40 to docking station 20 which may conveniently be pre-wired with connecting plugs to accept the additional components. This facilitates and enables system flexibility and retrofitting utilizing the selective combination of a variety of plug-in modules or building blocks.

The present invention provides a multiplicity of features and solutions to problems including enabling the continuing miniaturizing of portable transceivers while enabling the addition of features and expansion of operational capabilities such as SMS and external communication capability. In addition, transceiver 10 is maintained in position on docking station 20 enabling hands free use while providing the capabilities of antenna 54 which is normally more sensitive than miniaturized antenna 12 on the transceiver, and also providing power to recharge battery 7. This provides expanded capabilities and facilitates the use of portable communication system 1.

Micro controller 26 can be programmed to enable the utilization of keypad 67 on transceiver 10 to display on display 30 selected messages, such as those from the office, in advance of or to the exclusion of other messages in memory 28 or the uploading of selected stored messages. Alternatively, docking station 20 may include controls or keypad 70 for uploading and/or selective display of stored messages. Messages in memory 28 can be uploaded through connector 22 and receptacle 16 or through radio link or a antenna 54. While the speaker 69 in transceiver 10 is suitable for use in hands free operation of the transceiver when position on docking station 20, the docking station could include a separate speaker 71. This could also be used to enable voice messages storage and playback and will enable the use of the system as a personal manager to record and retrieve personal information messages such as a list of "to do" items or meeting notices. Transceiver 10 may be operated while positioned on docking station 20 which may be facilitated by including voice actuated switch 25 which can be located on transceiver 10 and/or docking station 20. The present invention can also be utilized in an office environment in which docking station 20 is mounted on a desk in a conveniently accessible location with transceiver 10 available for portable use around the office or off-site. The invention is applicable to analog as well as digital communication systems.

While the present invention has been described with respect to certain preferred embodiments thereof, it is to be understood that numerous variations in the details of construction, the arrangement and combination of parts, and the type of materials used may be made without departing from the spirit and scope of the invention.

What we claim is:

1. A portable communication system with expandable short message service comprising:

a portable wireless transceiver;

a fixed intelligent docking station including means to selectively support said transceiver in a docketed position and interconnect said transceiver and said docking station;

memory means connected to said docking station for storing a plurality of said short message service texts received by said transceiver and provided to said docking station through the interconnection therebetween;

a receiver for linking said transceiver to said memory means such that short message service texts may be forwarded from the transceiver to the memory means when said transceiver is separated from said docking station to enable the storage of the short message service texts during the separation; and display means for selectively displaying the text of messages stored in said memory means.

2. The communication system of claim 1 wherein said docking station includes an electronic digital memory to store a plurality of received short message service texts.

3. The communication system of claim 2 wherein said docking station is adapted for mounting in a fixed position within a vehicle in proximity to the operating position of said vehicle and includes means for selectively displaying said storage short message texts.

4. The communication system of claim 3 including an indicator to indicate the presence of at least one short message system text stored within said digital memory and wherein said memory means is separated from and connected to said docking station.

5. The communication system of claim 4 wherein said indicator is on said transceiver.

6. The communication system of claim 2 wherein said system includes means to operate said transceiver while supported on said docking station.

7. The communication system of claim 6 wherein said means to operate said transceiver includes a voice actuated transmit-receive switch.

8. The communication system of claim 3 wherein said portable transceiver includes a first rechargeable battery for the powering thereof, and said docking station includes means to provide recharging power from a second battery in said vehicle to said first battery through said interconnection when said transceiver is positioned on said docking station.

9. The communication system of claim 2 wherein said portable transceiver includes a keypad and said docking station includes a controller with means to control the display of selected messages within said memory means.

10. The communication system of claim 9 further including means at said docking station for storing and subsequent selective display of information originated at said docking station.

11. The communication system of claim 10 wherein said information includes voice stored messages.

12. The communication system of claim 10 wherein said information inlcudes personal information messages.

13. The communication system of claim 9 wherein said docking station further includes communication means for communication independent of said portable transceiver with units external to said transceiver and docking station.

14. The communication system of claim 13 wherein said communication means includes an infrared transmission link to a remotely located computer which in turn interfaces to external independent communication links.

15. The communication system of claim 2 wherein said docking station further includes an antenna and a receiver for linking said receiver to said memory when said transceiver separated from said docking station to enable the storage of short message service texts during the separation.

16. The communication system of claim 2 further including means to upload selected information stored in said memory to said transceiver.

17. The communication system of claim 16 further including means at said docking station to place information into storage in said memory.

18. The communication system of claim 16 further including means to select the type of information from that in said memory for display.

19. A portable communication system with expandable short message service comprising:

a portable wireless transceiver;

a fixed intelligent docking station including means to selectively support said transceiver in a docketed position and interconnect said transceiver and said docking station;

memory means connected to said docking station for storing a plurality of said short message service texts received by said transceiver and provided to said docking station through the interconnection therebetween; and a receiver for linking transmitted short message service texts for the transceiver directly with the memory means when said transceiver is separated from said docking station to enable the storage of short message service texts during the separation; and display means for selectively displaying the text of messages stored in said memory means.

* * * * *